(12) United States Patent  (10) Patent No.: US 8,437,940 B2
Borgmann et al.  (45) Date of Patent: May 7, 2013

(54) METHOD FOR DETERMINING WHETHER A CRANKSHAFT OF AN INTERNAL COMBUSTION ENGINE ROTATING FORWARD AFTER A REVERSE ROTATION IS OSCILLATING OR CONTINUES THE FORWARD MOVEMENT

(75) Inventors: Christian Borgmann, Dorsten (DE); Franz Dietl, Lappersdorf (DE); Valérie Gouzenne, Tournefeuille (FR); Andreas Läufer, Regensburg (DE)

(73) Assignees: Continental Automotive GmbH, Hannover (DE); Continental Automotive France, Toulouse (FR)

( * ) Notice: Subject to any disclaimer, the term of this patent is extended or adjusted under 35 U.S.C. 154(b) by 745 days.

(21) Appl. No.: 12/513,052

(22) PCT Filed: Oct. 26, 2007

(86) PCT No.: PCT/EP2007/061530
§ 371 (c)(1),
(2), (4) Date: Jan. 7, 2010

(87) PCT Pub. No.: WO2008/052938
PCT Pub. Date: May 8, 2008

(65) Prior Publication Data
US 2010/0138131 A1  Jun. 3, 2010

(30) Foreign Application Priority Data
Oct. 31, 2006 (DE) .......................... 10 2006 051 353

(51) Int. Cl.
G06F 19/00 (2011.01)
(52) U.S. Cl.
USPC ............... 701/99; 701/22; 701/112; 701/114; 123/179.4; 123/182.1; 123/436; 123/479; 702/151; 73/114.03

(58) Field of Classification Search ............ 701/99, 701/112, 22, 114, 111; 73/114.04, 114.05, 73/35.03; 123/479, 179, 182, 406; 702/151; 477/143; 440/53; 396/110
See application file for complete search history.

(56) References Cited

U.S. PATENT DOCUMENTS

| | | | |
|---|---|---|---|
| 6,907,342 B1 | 6/2005 | Matsuoka | 701/113 |
| 2004/0153235 A1* | 8/2004 | Kataoka et al. | 701/112 |
| 2004/0159297 A1* | 8/2004 | Kataoka et al. | 123/179.4 |
| 2006/0162701 A1* | 7/2006 | Kassner | 123/479 |
| 2006/0190161 A1* | 8/2006 | Nakamura | 701/114 |
| 2008/0103683 A1* | 5/2008 | Tabata et al. | 701/112 |

FOREIGN PATENT DOCUMENTS

| | | |
|---|---|---|
| DE | 44 34 833 A1 | 4/1996 |
| DE | 102 45 640 B3 | 4/2004 |
| WO | 2005/124287 A | 12/2005 |

OTHER PUBLICATIONS

International PCT Search Report, PCT/EP2007/061530, 4 pages.

* cited by examiner

Primary Examiner — Tuan C. To
Assistant Examiner — Jelani Smith
(74) Attorney, Agent, or Firm — King & Spalding L.L.P.

(57) ABSTRACT

In a method for determining, whether a crankshaft of a combustion engine rotating forward after a reverse rotation is oscillating or continues the forward movement, when noticing a reverse rotation of the crankshaft, the covered rotational angle during a reverse rotation is detected, an actual threshold is computed by adding the covered rotational angle and a predetermined safety distance. The rotational angle of the crankshaft rotating immediately forward after a reverse rotation is compared to the actual threshold.

10 Claims, 1 Drawing Sheet

METHOD FOR DETERMINING WHETHER A CRANKSHAFT OF AN INTERNAL COMBUSTION ENGINE ROTATING FORWARD AFTER A REVERSE ROTATION IS OSCILLATING OR CONTINUES THE FORWARD MOVEMENT

CROSS-REFERENCE TO RELATED APPLICATIONS

This application is a United States national phase filing under 35 U.S.C. §371 of International Application No. PCT/EP2007/061530, filed Oct. 26, 2007 which claims priority to German Patent Application No. 10 2006 051 353.3, filed Oct. 31, 2006. The complete disclosure of the above-identified application is hereby fully incorporated herein by reference.

TECHNICAL FIELD

The present invention relates to a method for determining whether a crankshaft of an internal combustion engine rotating forward after a reverse rotation is oscillating or continues the forward movement. The invention in particular concerns a method for preventing multiple initiation of the same system events in the case of a reverse rotation of the crankshaft identified in the interim.

BACKGROUND

Internal combustion engines with modern electronic operation control units (engine management) have a sensor device which detects the rotational angle of the crankshaft. A crankshaft sensor and a camshaft sensor are usually employed for this purpose. Sensors have also already become well known by means of which the rotational direction of the crankshaft can be detected. Such sensor devices make it possible to determine the angular position of the crankshaft when the internal combustion engine is switched off.

When the internal combustion engine is started again, the angular position of the crankshaft is then immediately made available, which makes possible a correspondingly quick start of the internal combustion engine. This in its turn provides the option of designing the operation control unit in such a way that in order to save on fuel it automatically switches off the internal combustion engine when the vehicle comes to a standstill and starts it again as soon as a corresponding request from the driver is identified.

In the case of such a start of the internal combustion engine, the operation control unit may receive the information from the sensor device about a short reverse rotation of the crankshaft. This can for example be caused by an error in the sensor device; however it can also be an actual reverse rotation of the crankshaft, for example when on oscillating the crankshaft, the starter switches off too early.

On identifying a reverse rotation of the crankshaft, no system events such as for example, fuel injection or gas-mixture ignition should be initiated in order to prevent damage. If after a reverse rotation process, the sensor device again indicates a forward movement of the crankshaft, this may involve the forward phase of an oscillating process, but may also involve a continuation of the start process. Should it involve an oscillating process, no further action should be taken. If on the other hand, should the start process is continued, the initiation of system events such as fuel injection and gas-mixture ignition should be enabled again as soon as possible in order not to delay the start process further.

Therefore, the operation control unit should be in the position to determine whether or not the crankshaft of an internal combustion engine rotating forward after a reverse rotation is oscillating or is continuing its forward movement. This is a requirement for ensuring that a system event that has already occurred once such as for example a fuel injection in a specific cylinder is not repeated. Otherwise, too much fuel will arrive in this cylinder. In addition, the switching off of the injection and the ignition when the reverse rotation has taken place is exhaust-gas-relevant, because under the circumstances, cylinders contain a non-ignitable mixture or the mixture is discharged unburnt. For this reason, it would in addition be desirable in the event of reverse rotation having taken place to be able to diagnose a sensor device error.

SUMMARY

According to various embodiments, a method can be provided by means of which it is possible to determine whether or not a crankshaft of an internal combustion engine rotating forward after a reverse rotation is oscillating or is continuing its forward movement.

According to an embodiment, a method for determining whether a crankshaft of an internal combustion engine rotating forward after a reverse rotation is oscillating or is continuing its forward movement, with the internal combustion engine having an electronic operation control unit and a sensor device in order to determine the rotational angle of the crankshaft or of a value depending thereon and the rotational direction of the crankshaft, may comprise the steps of:—When a reverse rotation of the crankshaft is detected, determining the covered rotational angle during a reverse rotation or the value depending thereon,—computing an actual threshold by means of adding the covered rotational angle or the value depending thereon during a reverse rotation and a predetermined safety distance, and—comparing the continuous rotational angle that the crankshaft covers during a forward movement following the reverse rotation, or the value depending thereon to the actual threshold.

According to a further embodiment, the initiation of system events which depend on the angular position of the crankshaft may be prevented during the identified reverse rotation and may only be enabled again when the continuous rotational angle of the crankshaft or the value depending thereon exceeds the actual threshold during the forward movement following the reverse rotation. According to a further embodiment, an error in the sensor device may be detected when the rotational angle of the crankshaft or the value depending thereon exceeds the actual threshold during the forward movement following the reverse rotation. According to a further embodiment, the method may be applied during a start process of the internal combustion engine.

BRIEF DESCRIPTION OF THE DRAWINGS

Further details of the invention are explained with reference to the figures, in which.

DETAILED DESCRIPTION

Figure 1:
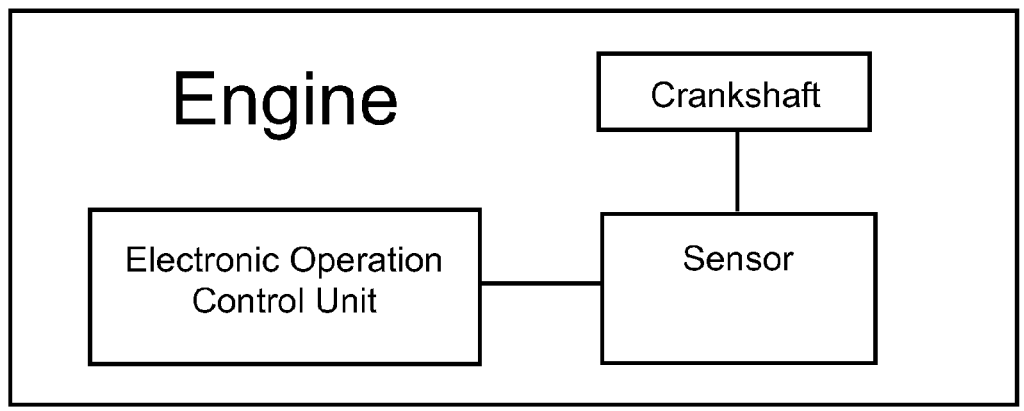
FIG. 1 shows a schematic of an internal combustion engine having a crankshaft, a crankshaft sensor, and a electronic operation control unit, according to an embodiment

The various embodiments may have the following steps;
On detection of a reverse rotation of the crankshaft, the covered rotational angle during a reverse rotation or the value depending on it is recorded;
An actual threshold is computed by means of adding the covered rotational angle during a reverse rotation or the value depending on it and a predetermined safety distance; and
The continuous rotational angle that the crankshaft covers during a forward movement following the reverse rotation is compared to the actual threshold.

The values depending on the rotational angle of the crankshaft are primarily impulses produced by means of the teeth or the edges of the teeth of the appropriate crankshaft sensors. In order to carry out the method in accordance with various embodiments it is thus sufficient the rotational angle of the crankshaft, as used in practice to be determined only indirectly by means of the teeth or the impulses produced by means of the teeth.

The method in accordance with various embodiments is based on the following consideration: If the crankshaft of an internal combustion engine oscillates in the case of an interrupted start process, the rotational movement of the crankshaft is in each case braked by means of the compression in a cylinder, until the rotational direction reverses and the crankshaft runs in the opposite direction against the compression in another cylinder. The amplitude of the oscillation of the crankshaft resulting from this decreases with each start process. When the crankshaft covers a certain rotational angle in the reverse direction during oscillation, it can only cover a smaller rotational angle during the subsequent forward movement. In accordance with various embodiments, the actual threshold provided that is composed of the rotational angle covered in the reverse rotation or the value depending on it and a safety distance that can be predetermined thus allows a clear distinction between an oscillation and a continuation of the forward movement of the crankshaft.

This distinction is used in a further embodiment to enable again the initiation of system events such as the fuel injection and the gas-mixture ignition, the initiation of which was prevented during the reverse rotation when the rotational angle of the forward movement following the reverse rotation or the value depending on it exceeds the actual threshold. This ensures that corresponding system events, which are initiated in a specific rotational position of the crankshaft, are not initiated once more after a reverse rotation and a forward movement of the crankshaft.

In addition, the distinction made possible by the various embodiments between an oscillation and a continuation of the forward movement of the crankshaft can be used for the diagnosis function. Namely, if the rotational angle of the forward movement following the reverse rotation or the value depending on this exceeds the actual threshold, this means that a short reverse rotation of the crankshaft was indicated during the start process. During a start process proceeding in an orderly manner a reverse rotation of the crankshaft cannot normally take place. In this case there is very probably an error in the sensor device.

Although the various method embodiments can basically be used for all operating conditions of a running internal combustion engine, it can however be used particularly advantageously when the internal combustion engine is being started.

Figure 2:
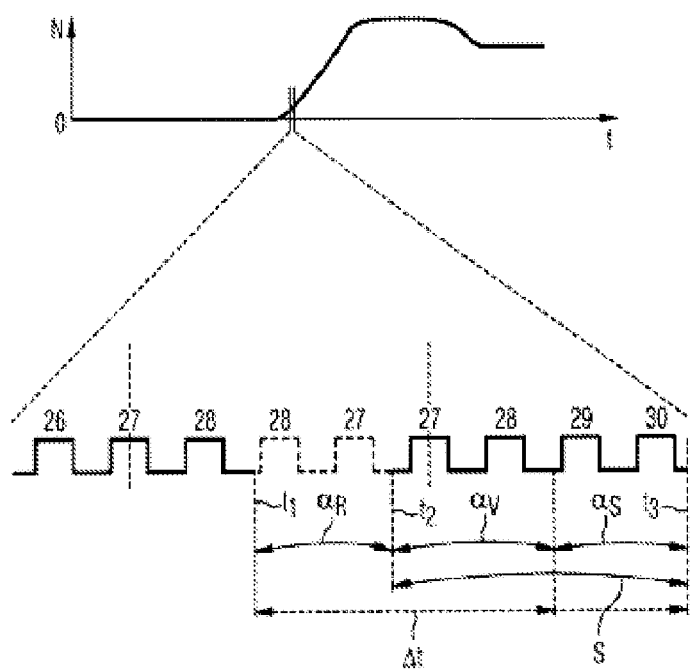
FIG. 2 shows the inventive method based on pulses of a crankshaft sensor, according to one embodiment.

In the top half of FIG. 2, the curve of the rotational speed N of an internal combustion engine is plotted over time t. The bottom part of FIG. 2 shows the impulse of a crankshaft sensor (not shown) during a short period of time in the acceleration phase of the start process. The impulses are designated with whole numbers in accordance with the teeth of a crankshaft transmitting wheel of the crankshaft sensor. The crankshaft sensor forms part of a sensor device that detects not only the rotational angle, but can also detect the rotational direction of the crankshaft rotation. Such sensor devices (see for example WO 2005/124287 A1) are known in the prior art so that this is not discussed in greater detail.

It is now assumed that when the impulses occur in accordance with a tooth 27, a specific system event such as for example a fuel injection, a gas-mixture ignition, a segment trigger or the like is initiated. In addition, it is assumed that at a point in time $t_1$, that is after the impulses have occurred in accordance with a tooth 28, the sensor device indicates a reverse rotation of the crankshaft. In the present case, the resulting indicated reverse rotation of the crankshaft takes place over two teeth of the crankshaft transmitting wheel, which is indicated by means of the dashed impulses 28 and 27 as well as the rotational angle $\alpha_R$.

As soon as the sensor device has indicated a reverse rotation of the crankshaft, the operation control unit prevents the initiation of system events, in the way that they were initiated on the first detection of a tooth 27. In this way, it is ensured that these system events are not initiated twice, which would otherwise have led to the disadvantages as described in the introduction.

As soon as the sensor device and thereby the operation control unit has identified a renewed forward movement of the crankshaft at a point in time $t_2$, an actual threshold S is computed, which makes it possible to distinguish between an oscillating process and a continuation of the start process. For this purpose, it is assumed that during an oscillating process, the rotational angle $\alpha_V$ of the crankshaft for the forward movement is smaller than the rotational angle $\alpha_R$ of the crankshaft for the reverse rotation. If the rotational angle $\alpha_V$ of the crankshaft for the forward movement is thus greater than the rotational angle $\alpha_R$ for the reverse rotation plus a safety distance, there can be no oscillating process.

In this case, the actual threshold S is computed from the rotational angle $\alpha_V$, which is the same as the covered rotational angle $\alpha_R$ in the case of the reverse rotation, plus a safety distance $\alpha_S$ $$S = \alpha_V + \alpha_S$$

$$\alpha_V = \alpha_R$$

With the method according to various embodiments, the rotational angle of the crankshaft for the forward movement as from the point in time $t_2$ is now compared to the actual threshold S.

If the rotational angle of the crankshaft for the forward movement does not exceed the threshold S then oscillation occurs. No further action needs to be taken.

If, however, on the other hand, the rotational angle of the crankshaft for the renewed forward movement exceeds the threshold S (point in time $t_3$), the starting of the prevented system events is again enabled. The start process can then immediately be continued. In this case it is thus ensured that the corresponding system events during the period $\Delta t$ are not initiated, as a result of which a double initiation is prevented.

If the crankshaft in the case of the renewed forward movement exceeds the actual threshold S, then this makes it possible to conclude that no actual reverse rotation of the crankshaft was present. This allows a diagnosis of a high probability of an error in the sensor device. A plausibility check of this diagnosis is produced when a corresponding reverse rotation detection occurs multiple times.

The invention claimed is:

1. A method for determining whether a crankshaft of an internal combustion engine rotating forward after a reverse rotation is oscillating or is continuing its forward movement, with the internal combustion engine having an electronic operation control unit and a sensor device in order to determine the rotational angle of the crankshaft or of a value depending thereon and the rotational direction of the crankshaft, the method comprising the steps of:
- when a reverse rotation of the crankshaft is detected, determining the covered rotational angle during the reverse rotation or the value depending thereon,
- computing an actual threshold by means of adding the covered rotational angle or the value depending thereon during a reverse rotation and a predetermined safety distance, and
- comparing the rotational angle that the crankshaft covers during a forward movement following the reverse rotation, or the value depending thereon to the actual threshold.

2. The method according to claim 1, wherein the initiation of system events which depend on the angular position of the crankshaft is prevented during the identified reverse rotation and is only enabled again when the rotational angle of the crankshaft or the value depending thereon exceeds the actual threshold during the forward movement following the reverse rotation.

3. The method according to claim 1, wherein an error in the sensor device is detected when the rotational angle of the crankshaft or the value depending thereon exceeds the actual threshold during the forward movement following the reverse rotation.

4. The method according to claim 1, wherein the method is applied during a start process of the internal combustion engine.

5. A system for determining whether a crankshaft of an internal combustion engine rotating forward after a reverse rotation is oscillating or is continuing its forward movement, comprising an internal combustion engine having an electronic operation control unit and a sensor device in order to determine the rotational angle of the crankshaft or of a value depending thereon and the rotational direction of the crankshaft, opwherein the electronic operation control unit and sensor are operable
- to determine, when a reverse rotation of the crankshaft is detected, the covered rotational angle during the reverse rotation or the value depending thereon,
- to compute an actual threshold by means of adding the covered rotational angle or the value depending thereon during a reverse rotation and a predetermined safety distance, and
- to compare the rotational angle that the crankshaft covers during a forward movement following the reverse rotation, or the value depending thereon to the actual threshold.

6. The system according to claim 5, wherein the initiation of system events which depend on the angular position of the crankshaft is prevented during the identified reverse rotation and is only enabled again when the rotational angle of the crankshaft or the value depending thereon exceeds the actual threshold during the forward movement following the reverse rotation.

7. The system according to claim 5, wherein an error in the sensor device is detected when the rotational angle of the crankshaft or the value depending thereon exceeds the actual threshold during the forward movement following the reverse rotation.

8. A method for an electric controller unit to control system events of an internal combustion engine, the method comprising the steps of:
- detecting a reverse rotation of a crankshaft associated with the internal combustion engine,
- upon said detection of said reverse rotation, determining the covered rotational angle during the reverse rotation, or a value depending thereon,
- computing an actual threshold by means of adding the covered rotational angle or the value depending thereon and a predetermined safety distance,
- comparing the rotational angle that the crankshaft covers during a forward movement following the reverse rotation, or a value depending thereon, to the actual threshold; and
- controlling the internal combustion engine so that the system events may only occur in the event that the crankshaft has covered the actual threshold.

9. The method according to claim 8, wherein an error in the sensor device is detected when the rotational angle of the crankshaft or the value depending thereon exceeds the actual threshold during the forward movement following the reverse rotation.

10. The method according to claim 8, wherein the method is applied during a start process of the internal combustion engine.

* * * * *